United States Patent Office 2,762,837
Patented Sept. 11, 1956

2,762,837
ALPHA-(1,1,2,2-TETRACYANOETHYL) KETONES AND THEIR PREPARATION

William Joseph Middleton, Wilmington, Del., assignor to E. I. du Pont de Nemours and Company, Wilmington, Del., a corporation of Delaware No Drawing. Application March 16, 1954, Serial No. 416,719

7 Claims. (Cl. 260—465.8)

This invention relates to acidic ketones and their preparation and, also, to metal salts of such ketones.

In application Ser. No. 382,859, filed September 28, 1953 in the name of R. E. Heckert, it has been shown that tetracyanoethylene reacts readily with certain hydrogen-bearing amines with the loss of hydrogen cyanide to form N-tricyanovinylamines and in application Ser. No. 382,860, also filed September 28, 1953 in the name of R. E. Heckert, it has been shown that tetracyanoethylene reacts readily with certain other hydrogen-bearing amines with the loss of hydrogen cyanide to form C-tricyanovinylamines. Consequently, one skilled in the art would expect that tetracyanoethylene would react with any organic compound bearing an active hydrogen atom to give the corresponding tricyanovinyl derivative and hydrogen cyanide.

An object of the present invention is to provide a new class of acidic ketones. A further object is to provide a process of preparing such ketones. A still further object is to provide, as a class of new compounds, the metal salts of the acidic ketones. Other objects will be apparent from the description of the invention given hereinafter.

The above objects are accomplished according to the present invention by reacting tetracyanoethylene with ketones containing a hydrogen-bearing aliphatic carbon atom alpha to the ketone group to form alpha-(1,1,2,2-tetracyanoethyl)ketones. Salts of these ketones are formed by reacting the ketones with metal hydroxides and other bases.

It has now been discovered, entirely contrary to normal expectations that tetracyanoethylene reacts readily with the herein characterized ketones, not to give tricyanovinyl derivatives, i. e., compounds containing the tricyanovinyl group $(CN)_2C=C(CN)—$, but rather alpha-(1,1,2,2-tetracyanoethyl)ketones. This can be illustrated by the reaction of tetracyanoethylene with acetone to form alpha-(1,1,2,2-tetracyanoethyl) acetone, alternately named 4,4,5,5-tetracyano-2-pentanone, as follows:

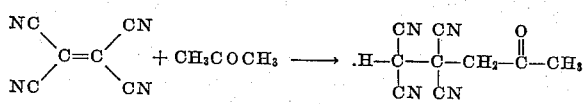

The hydrogen of the tetracyanoethyl group so formed is strongly acidic and is replaced by metal upon the ready reaction of these ketones with a metal hydroxide or other base to form the salt of the ketone.

The alpha-(1,1,2,2-tetracyanoethyl)ketones of the present invention may be designated by the following formula

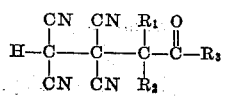

in which $R_1$ and $R_2$ can be hydrogen, hydrocarbon radicals, or halogenated hydrocarbon radicals or, taken together, a divalent hydrocarbon or halogenated hydrocarbon radical forming an alicyclic structure, and $R_3$ can be a hydrocarbon or halogenated hydrocarbon radical or, when taken together with either $R_1$ or $R_2$, a divalent hydrocarbon or halogenated hydrocarbon radical forming an alicyclic structure.

The reaction of tetracyanoethylene with alpha-hydrogen ketones according to the present invention can be brought about readily by mixing the tetracyanoethylene with the ketones and allowing the mixture to stand at room temperature. To hasten the reaction and to produce higher yields of the alpha-(1,1,2,2-tetracyanoethyl) ketone product, certain catalysts may be added and the reaction may be carried out in the presence of a solvent or diluent, such as an excess of the ketone being employed in the reaction.

In a preferred embodiment of this invention, tetracyanoethylene is dissolved in a molecular excess of acetone and allowed to stand in the presence of "molecular silver" or a volatile acidic catalyst at room temperature for one day. The excess ketone and catalyst are evaporated, and the remaining alpha-(1,1,2,2-tetracyanoethyl) acetone is purified by recrystallization.

The examples below, in which parts are by weight, serve to illustrate this invention.

Tetracyanoethylene for use in the present invention can be prepared by reaction of malononitrile with sulfur monochloride.

"Molecular" silver which is used as a catalyst in several of the examples below can be prepared according to the method of Gomberg and Cone, Ber. 39, 3286 (1906).

Example I

One hundred parts of concentrated hydrochloric acid (37.2% hydrogen chloride by weight) is added slowly to a solution of 128 parts of tetracyanoethylene in 396 parts of acetone at 0° C. A white precipitate forms. When the mixture is brought to room temperature and allowed to stand for 2 hours, the precipitate dissolves. Volatile components are removed by evaporation under a stream of nitrogen. The solid residue is washed with water and recrystallized from a 1:1 mixture of ethyl acetate and petroleum ether. An additional recrystallization from ethyl alcohol produces 65 parts (35%) of white, waxy plates which decompose on slow heating above 100° C. and melt at 115–120° C. (black melt). An additional recrystallization produces alpha-(1,1,2,2-tetracyanoethyl) acetone in the form of white plates, M. P. 118° C.–120° C.

Anal.—Calc'd. for $C_9H_6N_4O$: C, 58.06, M. W., 186.17; H, 3.25; N, 30.10. Found: C, 58.26, 58.47; H, 3.21, 3.22; N, 30.04, 30.10; M. W., 199, 200.

Example II

A solution of 64 parts of tetracyanoethylene in 396 parts of acetone is stirred for 8 hours with 200 parts of "molecular" silver. The stirring is discontinued, and the solution is allowed to stand overnight. The silver is removed by filtration, and the solution is evaporated to dryness. There is obtained 84 parts (90%) of solid product. This solid is recrystallized from ethyl acetate. There is obtained 45 parts of alpha-(1,1,2,2-tetracyanoethyl)acetone in the form of white plates, M. P. 120° C.– 122° C. This compound is insoluble in water but dissolves in 5% sodium bicarbonate solution to form the dissolved sodium salt.

Anal.—Calc'd. for $C_9H_6N_4O$: C, 58.06, M. W., 186.17; H, 3.25; N, 30.10. Found: C, 58.26, 58.38; H, 3.52, 3.50; N, 29.73, 29.99; M. W., 178, 185.

The infrared spectrum shows a strong band at 5.8 mu for carbonyl absorption. The spectra of this product and the product obtained from the treatment of acetone and tetracyanoethylene with hydrochloric acid are identical. The following structure has been assigned on the basis of the infrared spectrum, the high acidity, the molecular weight determinations and the elemental analysis of this compound:

$$\begin{array}{c} \text{CN} \quad \text{CN} \quad\quad \text{O} \\ | \quad\quad | \quad\quad\quad \| \\ \text{H}-\text{C}-\text{C}-\text{CH}_2-\text{C}-\text{CH}_3 \\ | \quad\quad | \\ \text{CN} \quad \text{CN} \end{array}$$

Boron trifluoride is also an effective catalyst for this reaction. When a solution of tetracyanoethylene in acetone is treated with boron trifluoride, an almost quantitative yield of alpha-(1,1,2,2-tetracyanoethyl)acetone is obtained.

Example III

A solution of 64 parts of tetracyanoethylene in 403 parts of methyl ethyl ketone containing 50 parts of "molecular" silver is stirred at room temperature for 6 hours and is then allowed to stand overnight. The silver is removed by filtration, and the filtrate is evaporated to dryness. The light yellow residue is washed with dry ether. There is obtained 70 parts (70%) of crude product. The product is recrystallized from ethyl acetate to give alpha-(1,1,2,2-tetracyanoethyl)-alpha-methyl acetone, alternately named 4,4,5,5-tetracyano-3-methyl-2-pentanone, in the form of a white crystalline solid, M. P. 135° C.–137° C. The product is soluble in sodium bicarbonate solution to form the sodium salt. Infrared absorption for C=0, 5.83 mu.

*Anal.*—Calc'd. for $C_{10}H_8N_4O$: C, 59.99, M. W., 200.19; H, 4.03; N, 27.99. Found: C, 60.18, 59.95; H, 4.06, 4.10; N, 27.79, 27.53; M. W., 198, 187.

Example IV

A solution of 64 parts of tetracyanoethylene in 403 parts of methyl ethyl ketone is prepared and allowed to stand at room temperature for eight days. No catalyst is added. The solution is then evaporated to dryness, and the solid residue is washed with ethyl ether. There is obtained 30 parts of crude product which is recrystallized from ethyl acetate to give alpha-(1,1,2,2-tetracyanoethyl)-alpha-methyl acetone in the form of white crystals melting at 135° C.–137° C. This product is identical with that of Example III.

Example V

Tetracyanoethylene, 64 parts, is dissolved in 326 parts of diethyl ketone and allowed to stand over 10 parts of "molecular" silver at room temperature overnight. The silver is removed by filtration, and the filtrate is mixed with 357 parts of ethyl ether and 1321 parts of n-hexane. The precipitate which separates (85 parts, 80%) is recrystallized from a 1:1 mixture of ethyl acetate and n-hexane to yield alpha-(1,1,2,2-tetracyanoethyl)diethyl ketone, alternately named 5,5,6,6-tetracyano-4-methyl-3-hexanone, in the form of very flat needles, M. P. 93° C.–93.5° C. Infrared absorption for C=0: 5.83 mu.

*Anal.*—Calc'd. for $C_{11}H_{10}N_4O$: C, 61,67; H, 4.71; N, 26.16. Found: C, 61.84, 61.64; H, 4.72, 4.64; N, 26.20, 26.19.

Example VI

A solution of 64 parts of tetracyanoethylene in 403 parts of diisopropyl ketone is allowed to stand over 10 parts of "molecular" silver for one week. The silver is removed, and the solution is mixed with 330 parts of n-hexane. A white precipitate forms (60 parts, 50%) which is recrystallized from benzene. There is obtained 30 parts of alpha-(1,1,2,2-tetracyanoethyl)diisopropyl ketone, alternately named 5,5,6,6-tetracyano-2,4,4-trimethyl-3-hexanone, in the form of white needles, M. P. 119° C.–121° C. Infrared absorption for C=0: 5.85 mu.

*Anal.*—Calc'd. for $C_{13}H_{14}N_4O$: C, 64.45; H, 5.82; N, 23.13. Found: C, 64.26, 64.10; H, 5.80, 5.65; N, 23.09, 23.07.

The analytical data are in accord with:

$$\begin{array}{c} \text{CN} \quad \text{CN} \quad \text{CH}_3 \quad \text{O} \quad \text{CH}_3 \\ | \quad\quad | \quad\quad | \quad\quad \| \quad\quad | \\ \text{H}-\text{C}-\text{C}-\text{C}-\text{C}-\text{C}-\text{CH}_3 \\ | \quad\quad | \quad\quad | \quad\quad\quad | \\ \text{CN} \quad \text{CN} \quad \text{CH}_3 \quad\quad\, \text{H} \end{array}$$

Example VII

A solution of 64 parts of tetracyanoethylene and 379 parts of cyclopentanone is stirred with 50 parts of "molecular" silver for 6 hours and is allowed to stand at room temperature overnight. The solution is drowned in n-hexane. An oil separates which solidifies on standing for 1 hour. The solid is collected on a filter and washed with ethyl ether. There is obtained 95 parts (85%) of a white crystalline material. Recrystallization from ethanol produces alpha-(1,1,2,2-tetracyanoethyl)-cyclopentanone in the form of white plates, M. P. 139° C.–141° C. Infrared absorption for C=0: 5.70 mu.

*Anal.*—Calc'd. for $C_{11}H_8N_4O$: C, 62.26; H, 3.80; N, 26.40. Found: C, 62.71, 62.55; H, 4.02, 3.94; N, 26.37, 26.46.

The analytical data are in accord with $$\begin{array}{c} \quad\quad\quad\quad\quad\quad\quad\quad\quad \text{O} \\ \quad\quad\quad\quad\quad\quad\quad\quad\quad \| \\ \text{CN} \quad \text{CN} \quad\quad\,\, \text{C} \\ | \quad\quad | \quad\quad\quad / \quad \backslash \\ \text{H}-\text{C}-\text{C}-\text{CH} \quad\quad \text{CH}_2 \\ | \quad\quad | \quad\quad | \quad\quad\quad | \\ \text{CN} \quad \text{CN} \quad \text{CH}_2-\text{CH}_2 \end{array}$$

Example VIII

A solution of 64 parts of tetracyanoethylene in 474 parts of cyclohexanone is allowed to stand over 10 parts of "molecular" silver for 3 days at room temperature. The silver is removed by filtration. The filtrate is drowned in n-hexane, and the white precipitate that forms is collected on a filter and washed with n-hexane. There is obtained 92 parts (82%) of a white powder. After one recrystallization from a 1:1 mixture of ethyl acetate and n-hexane, 75 parts of alpha-(1,1,2,2-tetracyanoethyl) cyclohexanone in the form of white, flat needles are obtained, M. P. 134° C., with sublimation above 120° C. Infrared absorption for C=0: 5.83 mu.

*Anal.*—Calc'd for $C_{12}H_{10}N_4$: C, 63.70; H, 4.46; N, 24.77. Found: C, 63.87, 64.25; H, 4.46, 4.29; N, 24.75, 24.80

Example IX

A solution of 64 parts of tetracyanoethylene in 513 parts of warm acetophenone is stirred with 50 parts of "molecular" silver for 2 days. The silver is removed by filtration, and the solution is mixed with 440 parts of benzene and 1981 parts of n-hexane. The light yellow precipitate which forms upon standing (100 parts, 80%) is recrystallized from a 1:1 mixture of ethyl acetate and n-hexane. There is thus obtained alpha-(1,1,2,2-tetracyanoethyl) acetophenone, alternately named beta,beta-gamma,gamma-tetracyanobutyrophenone, in the form of a light yellow crystalline material, M. P. 140° C.–141° C. Infrared absorption for C=0: 5.93 mu.

*Anal.*—Calc'd. for $C_{14}H_8N_4O$: C, 67.74; H, 3.25; N, 22.56. Found: C, 67.75, 68.14; H, 3.26, 3.47; N, 22.49, 22.73.

The analytical data are in accord with $$\begin{array}{c} \text{CN} \quad \text{CN} \quad\quad \text{O} \\ | \quad\quad | \quad\quad\quad \| \\ \text{H}-\text{C}-\text{C}-\text{CH}_2-\text{C}-\bigcirc \\ | \quad\quad | \\ \text{CN} \quad \text{CN} \end{array}$$

Example X

A solution of 64 parts of tetracyanoethylene and 297 parts of p-chloroacetophenone in 222 parts of tetrahydrofuran is allowed to stand at room temperature for 4 days with 10 parts of "molecular" silver. The silver is removed by filtration, and the filtrate is mixed with 660 parts of n-hexane. The white solid which forms, is collected on a filter, washed with ethyl ether and recrystallized from a 1:1 mixture of ethyl acetate and n-hexane. There is obtained 85 parts (60%) of p-chloro-alpha-(1,1,2,2-tetracyanoethyl)acetophenone, alternately named p - chloro - beta,beta,gamma,gamma - tetracyanobutyrophenone, in the form of a white, crystalline material, M. P. 150° C.–152° C., with decomposition. Infrared absorption for C=O: 5.97 mu.

*Anal.*—Calc'd. for $C_{14}H_7N_4OCl$: C, 59.48; H, 2.50; N, 19.82; Cl, 12.54. Found: C, 59.80, 59.97; H, 2.49, 2.70; N, 19.77, 19.72; Cl, 12.60, 12.53.

Example XI

"Molecular" silver, 10 parts, is added to a solution of 64 parts of tetracyanoethylene and 170 parts of 1-acetonaphthone in 222 parts of tetrahydrofuran, and the solution is allowed to stand for one week. The silver is removed by filtration, and the filtrate is mixed with equal portions of ethyl ether and n-hexane. An orange precipitate forms (110 parts, 74%) which is collected on a filter and recrystallized from a 1:1 mixture of ethyl acetate and n-hexane to give alpha-(1,1,2,2-tetracyanoethyl)-1-acetonaphthone, alternately named beta,beta,gamma,gamma-tetracyano-1-butyronaphthone, in the form of a light orange, crystalline powder, M. P. 132° C.–133° C., with some decomposition above 120° C.

*Anal.*—Calc'd. for $C_{18}H_{10}N_4O$: C, 72.47; H, 3.38; N, 18.78. Found: C, 72.27, 72.37; H, 3.67, 3.84; N, 18.51, 18.41.

The analytical data are in accord with

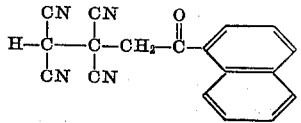

Example XII

"Molecular" silver, 10 parts, is added to a solution of 64 parts of tetracyanoethylene and 170 parts of 2-acetonaphthone in 222 parts of tetrahydrofuran, and the solution is allowed to stand for one week. The silver is removed by filtration, and the filtrate is drowned in a 1:1 mixture of ethyl ether and n-hexane. A white precipitate forms (140 parts, 94%) which is collected and recrystallized from a 1:1 mixture of ethyl acetate and n-hexane. There is obtained 90 parts of alpha-(1,1,2,2-tetracyanoethyl) - 2 - acetonaphthone, alternately named beta,beta,gamma,gamma-tetracyano - 2-butyronaphthone, in the form of white plates which decompose when heated above 125° C.

*Anal.*—Calc'd. for $C_{18}H_{10}N_4O$: C, 72.47; H, 3.38; N, 18.78. Found: C, 72.30, 72.47; H, 3.49, 3.52; N, 18.80, 18.94.

It will be understood that the above examples are merely illustrative and that the present invention broadly comprises, as new compounds, the alpha-(1,1,2,2-tetracyanoethyl) ketones, the metal salts thereof wherein the sole hydrogen of the tetracyanoethyl group is replaced by metal, and the process of reacting tetracyanoethylene with ketones containing a hydrogen-bearing aliphatic carbon atom alpha to the ketone group, to form alpha-(1,1,2,2-tetracyanoethyl)ketones.

The type of ketone reacted with tetracyanoethylene according to the present invention is critical in that at least one of the carbon atoms alpha to the ketone, i. e., carbonyl, group, must be an aliphatic carbon bearing at least one hydrogen atom. The fact that the hydrogen-bearing alpha carbon atom of the ketone must be aliphatic is illustrated by the failure of diphenyl ketone to react with tetracyanoethylene to form a tetracyanoethyl derivative. Aside from this critical characteristic, the structure of the ketone is not material to operativeness of the invention. The examples illustrate amply the widest variation in the rest of the ketone structure.

As will be noted from Example IV, the reaction of tetracyanoethylene with alpha-hydrogen ketones according to the present invention is a spontaneous reaction which requires no catalyst to cause the reaction to occur. However, when it is desired to shorten the time required for the reaction to take place, a catalyst may be added. As illustrative of catalysts suitable for this purpose, there may be mentioned strong acids in general such as hydrochloric acid, sulfuric acid, and phosphoric acid; the Friedel-Crafts type catalysts such as boron trifluoride, aluminum trichloride, and antimony trifluoride; and certain finely-divided metals such as "molecular" silver, Raney nickel and finely-divided ruthenium and platinum.

The reaction of alpha-hydrogen ketones with tetracyanoethylene may be carried out over a wide range of temperature, for example, from 0° C. to 100° C. and even higher, the range from 0° C. to 50° C. being preferred in order to provide for dissipation of the heat of reaction. Pressure is not critical, atmospheric pressure normally being used as a matter of convenience.

Solvents or diluents for use during the above reaction may comprise an excess of the ketone involved in the reaction or an organic solvent which is inert to the reactants. Such solvents are the aliphatic and aromatic hydrocarbons, alkyl and aryl ethers, and cyclic ethers such as tetrahydrofuran.

The alpha-(1,1,2,2-tetracyanoethyl)ketones of the present invention are characterized by the strong acidity of the single hydrogen atom of the 1,1,2,2-tetracyanoethyl group. This is most readily shown by the fact that all of these compounds dissolve in dilute aqueous solutions of sodium bicarbonate. When the oxides or hydroxides of heavier metals, such as silver, copper and zinc, are added to such bicarbonate solutions, the heavy metal salt of the alpha-(1,1,2,2-tetracyanoethyl)-ketone is precipitated.

The alpha-(1,1,2,2-tetracyanoethyl)ketones of the present invention are crystalline solids which are stable at room temperature for extended periods of time in the absence of oxygen and moisture. However, when exposed to the oxygen and moisture of the atmosphere, these products slowly decompose, giving off, among other decomposition products, hydrogen cyanide. They are thus highly useful as insecticides and fumigants since they are readily stored without decomposition prior to use and after application they undergo decomposition steadily and uniformly over long periods of time.

As many apparently widely different embodiments of this invention may be made without departing from the spirit and scope thereof, it is to be understood the invention is not limited to the specific embodiments thereof except as defined in the appended claims.

The invention claimed is:

1. Alpha-(1,1,2,2-tetracyanoethyl) ketones of the formula

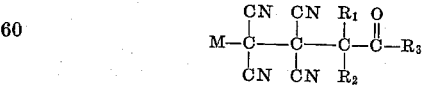

wherein M is from the group consisting of hydrogen and basic metals and $R_1$, $R_2$ and $R_3$ are from the group consisting of monovalent hydrocarbon radicals, monovalent halogenated hydrocarbon radicals, divalent hydrocarbon and halogenated hydrocarbon radicals where a single radical represents two R's in an alicyclic structure, and, in the cases of $R_1$ and $R_2$ only, hydrogen.

2. Alpha-(1,1,2,2-tetracyanoethyl)acetone.

3. Process of preparing an alpha-(1,1,2,2-tetracyanoethyl) ketone which comprises reacting tetracyanoethylene with a ketone containing a hydrogen-bearing aliphatic carbon atom alpha to the ketone group.

4. Process of preparing an alpha-(1,1,2,2-tetracyanoethyl) ketone which comprises reacting tetracyanoethylene in a liquid medium at a temperature of 0° C. to 50° C. with a ketone containing a hydrogen-bearing aliphatic carbon atom alpha to the ketone group.

5. Process as set forth in claim 4 wherein said reaction is carried out in the presence of "molecular" silver.

6. Process as set forth in claim 4 wherein said reaction is carried out in the presence of a volatile acidic catalyst.

7. Process as set forth in claim 4 wherein said liquid medium is an excess of said ketone.

References Cited in the file of this patent

UNITED STATES PATENTS

| | | |
|---|---|---|
| 2,264,354 | Alder et al. | Dec. 2, 1941 |
| 2,386,736 | Bruson | Oct. 9, 1945 |
| 2,403,570 | Wiest et al. | July 9, 1946 |